United States Patent
Tien

(10) Patent No.: US 9,642,426 B2
(45) Date of Patent: May 9, 2017

(54) PROTECTIVE COVER

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/474,573

(22) Filed: Sep. 2, 2014

(65) Prior Publication Data

US 2016/0021996 A1    Jan. 28, 2016

(30) Foreign Application Priority Data

Jul. 25, 2014   (CN) .................. 2014 2 04139038 U

(51) Int. Cl.
*A45C 11/00* (2006.01)
*B65D 81/05* (2006.01)
*H04B 1/3888* (2015.01)

(52) U.S. Cl.
CPC ............ *A45C 11/00* (2013.01); *B65D 81/051* (2013.01); *B65D 81/053* (2013.01); *H04B 1/3888* (2013.01); *A45C 2011/002* (2013.01)

(58) Field of Classification Search
CPC ........ A45C 11/00; A45C 2011/001–2011/003; A45F 5/00; B65D 81/022; B65D 81/05; B65D 81/051; B65D 81/053
USPC .................................. D14/250; D3/218, 269
See application file for complete search history.

(56) References Cited

U.S. PATENT DOCUMENTS

| | | | | |
|---|---|---|---|---|
| 5,265,720 A | * | 11/1993 | Meliconi | H01H 9/0242 150/165 |
| 5,383,091 A | * | 1/1995 | Snell | H01H 13/70 150/154 |
| D685,357 S | * | 7/2013 | Rekuc | D14/250 |
| 9,182,785 B2 | * | 11/2015 | Wyner | A45C 11/00 |
| 2002/0160156 A1 | * | 10/2002 | Yang | B65D 81/05 428/182 |
| 2010/0104814 A1 | * | 4/2010 | Richardson | H04B 1/3888 428/156 |
| 2014/0037897 A1 | * | 2/2014 | Wyner | A45C 3/001 428/138 |

* cited by examiner

*Primary Examiner* — Anthony Stashick
*Assistant Examiner* — Mollie Impink
(74) *Attorney, Agent, or Firm* — Steven Reiss

(57) ABSTRACT

A protective cover includes a base plate, an integral frame vertically extending from the edge of the base plate, and a shock absorption structure. The base plate and the integral frame cooperate to form a concave portion, which matches with a portable device and is configured to receive the portable device. The shock absorption structure includes a plurality of recesses formed on the internal surface of the integral frame and/or the base plate. The recesses are configured to entrap air therein when the portable device is received in the concave portion and the internal surface of the integral frame and the base plate are fully in contact with the surfaces of the portable device, so as to provide a cushion to protect the portable device against shock.

9 Claims, 4 Drawing Sheets

PROTECTIVE COVER

CROSS-REFERENCE TO RELATED APPLICATIONS

This application claims priority to Chinese Patent Application No. 201420413903.8 filed on Jul. 25, 2014, the contents of which are incorporated by reference herein.

FIELD

The subject matter herein generally relates to protective covers for electronic devices.

BACKGROUND

A protective cover is usually used for receiving a portable device and protecting the portable device.

BRIEF DESCRIPTION OF THE DRAWINGS

Implementations of the present disclosure will now be described, by way of example only, with reference to the attached figures.

DETAILED DESCRIPTION

Figure 1:
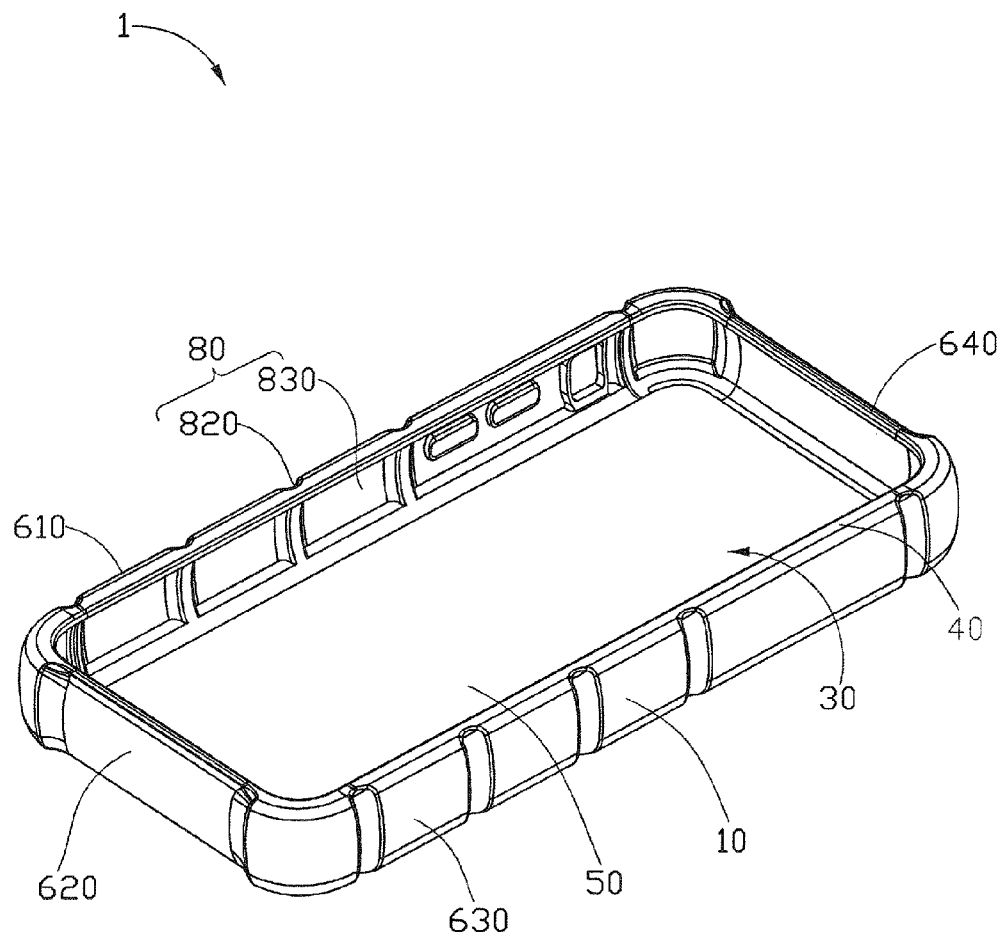
FIG. 1 is an isometric view of a protective cover.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure A definition that applies throughout this disclosure will now be presented.

The term "comprising" means "including, but not necessarily limited to"; it specifically indicates open-ended inclusion or membership in a so-described combination, group, series and the like.

Figure 2:
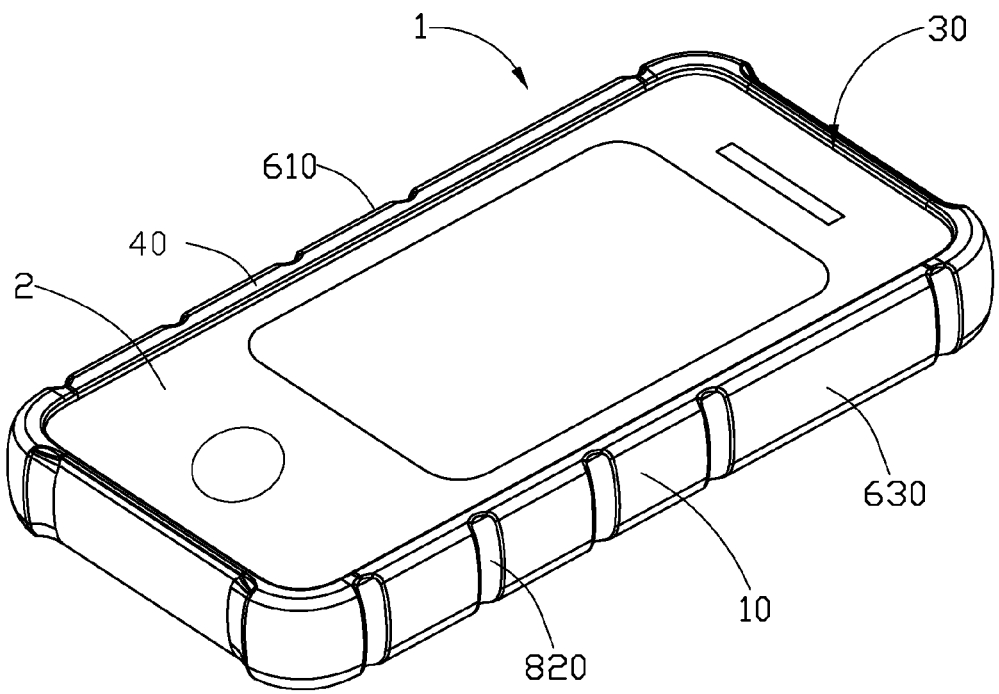
FIG. 2 is an isometric view of the protective cover of FIG. 1 receiving an electronic device.

FIG. 1 illustrates a protective cover 1 for receiving a portable device 2 (as shown in FIG. 2) and protecting the portable device 2. In one embodiment, the portable device 2 can be an electronic device, such as a smart phone, a tablet computer, a Walkman, or a digital photo frame. In other embodiments, the portable device 2 can be a moveable device that is not an electronic device, such as a suitcase, or a precision instruments box.

The protective cover 1 includes, but is not limited to, a base plate 50, an integral frame 10 vertically extending from the edge of the base plate 50, and an integral brim 40 extending inward from the edge of the integral frame 10. In the embodiment, the base plate 50 and the integral frame 10 cooperate to form a concave portion 30, which matches with the portable device 2 and is configured to receive the portable device 2. The integral brim 40 is configured to hold edges of the portable device 2 to prevent the portable device 2 from coming out of the concave portion 30.

The protective cover 1 can further include a shock absorption structure 80, which is configured to provide a cushion to protect the portable device 2 against shock when the portable device 2 falls to the floor. The shock absorption structure 80 can include a number of recesses 830 formed on the internal surface of the integral frame 10 and/or on the internal surface of the base plate 50. The recesses 830 are configured to entrap air therein when the portable device 2 is received in the concave portion 30 and the internal surfaces of the integral frame 10 and the base plate 50 are in contact with the surfaces of the portable device 2. Thereby, the entrapped air is able to provide a cushion to protect the portable device 2 against shock when the portable device 2 falls to the floor.

The integral frame 10 and the base plate 50 can be made of one or more flexible materials, such as thermoplastic polyurethanes (TPU) material, or polyurethane (PU) material.

The concave portion 30 can be a rectangle, the integral frame 10 includes four frames 610, 620, 630, and 640, and the recesses 830 can be formed on one or more of the frames 610, 620, 630, and 640. The recesses 830 can be further formed at the corner of the integral frame 10, in order to protect the corners of the portable device 2.

In other embodiments, the concave portion 30 can have a shape of round, oval, triangular, or polygon.

The shock absorption structure 80 can further include a plurality of arc grooves 820 formed on the outside surface of the integral frame 10 and each of which is located between two adjacent recesses 830.

Figure 3:
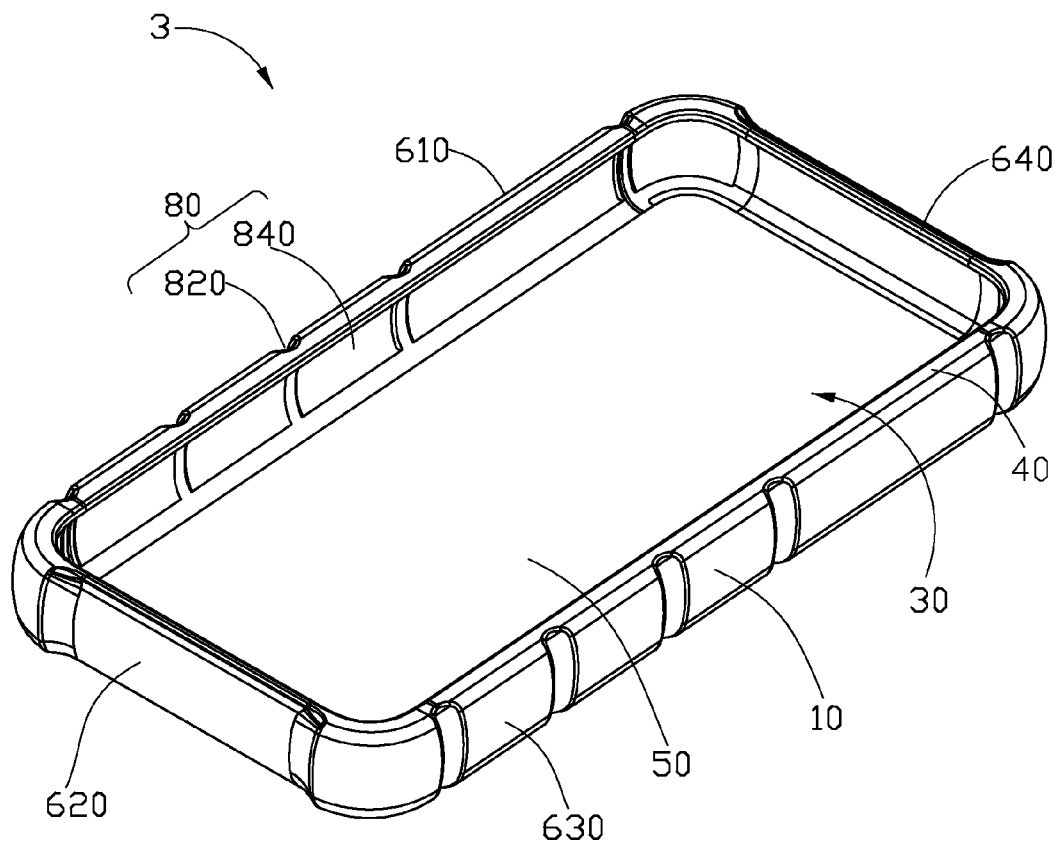
FIG. 3 is an isometric view of another protective cover.
Figure 4:
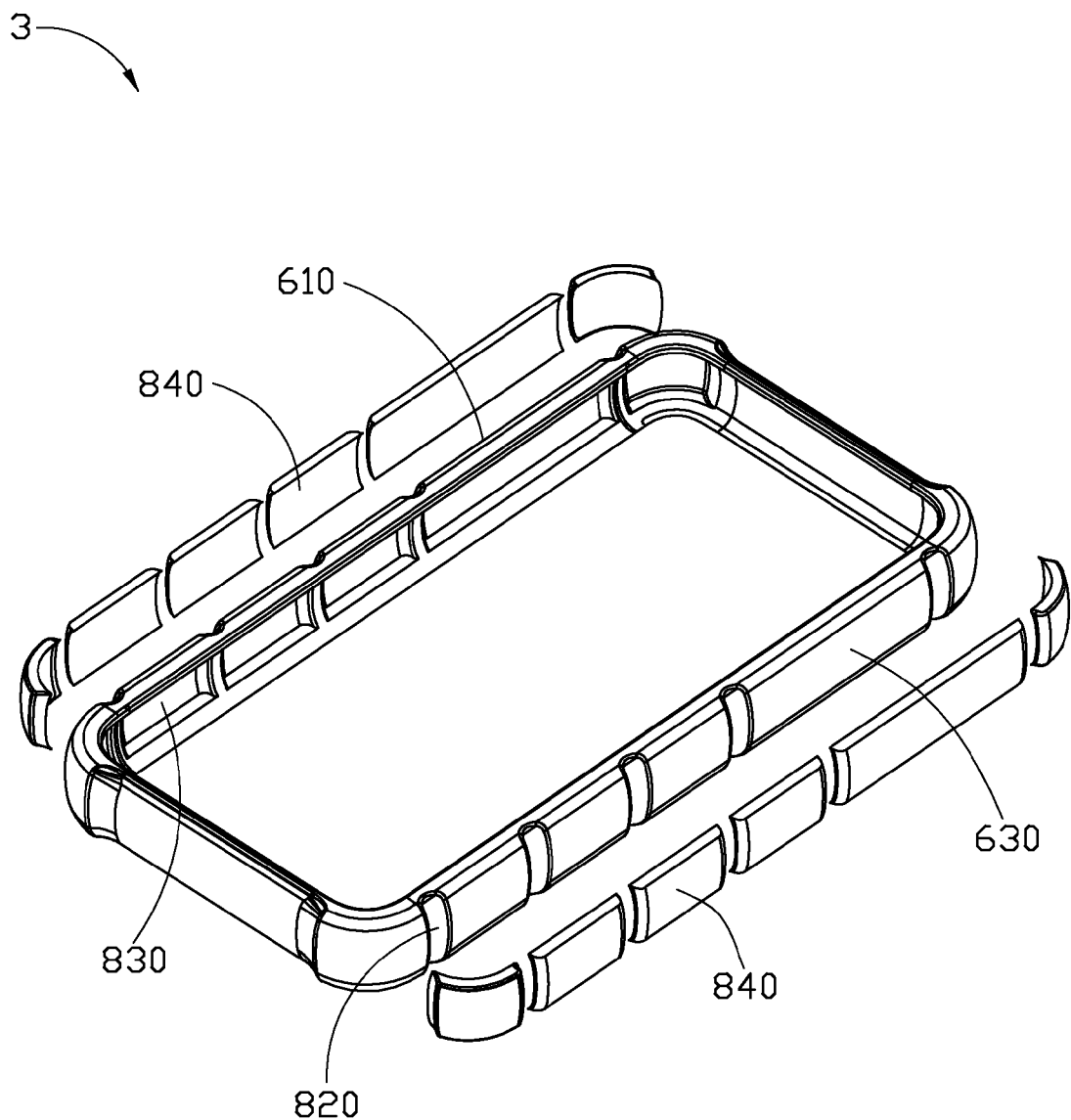
FIG. 4 is an exploded, isometric view of the protective cover of FIG. 3.

In an alternative embodiment, as shown in FIGS. 3 and 4, another protective cover 3 is illustrated. The shock absorption structure 80 of the protective cover 3 can further include a number of cushion pieces 840, which is inserted fully in the recesses 830 formed on the integral frame 10 and/or the base plate 50. Thereby, the cushion pieces 840 are able to provide a cushion to protect the portable device 2 against shock when the portable device 2 falls to the floor.

In still another embodiment, a portion of one or more of the recesses 830 can be inserted with the cushion pieces 840, so the cushion pieces 840 and air entrapped in the recesses 830 cooperate to provide a cushion to protect the portable device 2 against shock when the portable device 2 falls to the floor.

The materials of the cushion pieces 840 can be Expandable Polyethylene (EPE), natural rubber, sponge, or foam plastic.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size, and arrangement of parts within the principles of the present disclosure, up to and including the full extent established by the broad general meaning of the terms used in the claims.

What is claimed is:

1. A protective cover comprising:

a base plate;

an integral frame vertically extending from the edge of the base plate, wherein the base plate and the integral frame cooperate to form a concave portion, which matches with a portable device and is configured to receive the portable device; and a shock absorption structure comprising a plurality of recesses formed on the internal surface of the integral frame, and a plurality of arc grooves formed on the outside surface of the integral frame, each arc groove being located between two of the plurality of recesses, which are adjacent to each other, wherein the plurality of recesses are configured to provide a cushion to protect the portable device against shock;

wherein the plurality of recesses includes recesses that are formed at corners of the integral frame, and a recess that is formed where buttons are positioned;

wherein the integral frame comprises four frames, the four frames comprise a left frame, a right frame, a top frame, and a bottom frame;

wherein the recesses that are formed at the corners of the integral frame comprises a first recess that is formed at a left top corner, a second recess that is formed at a right top corner, a third recess that is formed at a left bottom corner, and a fourth recess that is formed at a right bottom corner;

wherein the plurality of arc grooves comprises a first groove formed on the outside surface of the top frame, and a second groove formed on the outside surface of the bottom frame, the first groove is located between the first recess and the second recess, and the second groove is located between the third recess and the fourth recess;

wherein the plurality of recesses are configured to entrap air therein when the portable device is received in the concave portion and the internal surface of the integral frame and the base plate are in contact with the surfaces of the portable device, so as to provide a cushion to protect the portable device against shock.

2. The protective cover as described in claim 1, further comprising an integral brim extending inward from the edge of the integral frame, wherein the integral brim is configured to hold edges of the portable device to prevent the portable device from coming out of the concave portion.

3. The protective cover as described in claim 1, wherein the integral frame and the base plate are made of one or more flexible materials.

4. The protective cover as described in claim 1, wherein the shock absorption structure further comprises a plurality of cushion pieces inserted in the plurality of recesses formed on the integral frame, wherein the plurality of cushion pieces are configured to provide a cushion to protect the portable device against shock.

5. The protective cover as described in claim 1, wherein the plurality of recesses are configured to entrap air therein when the portable device is received in the concave portion and the internal surface of the integral frame and the base plate are in contact with the surfaces of the portable device, so as to provide a cushion to protect the portable device against shock.

6. The protective cover as described in claim 1, wherein a number of the buttons equals to three.

7. The protective cover as described in claim 1, wherein a total number of recesses formed on the internal surface of the left frame equals to four, and a total number of recesses formed on the internal surface of the right frame equals to four.

8. The protective cover as described in claim 1, wherein the first groove and the second groove have a same first size, each of grooves formed on the outside surface of the left frame and the right frame has a same second size.

9. The protective cover as described in claim 8, wherein the first size is greater than the second size.

* * * * *